(12) United States Patent
VanderGriend et al.

(10) Patent No.: US 8,046,989 B2
(45) Date of Patent: Nov. 1, 2011

(54) COOLING DEVICE FOR HIGH TEMPERATURE EXHAUST

(75) Inventors: Ben VanderGriend, Woodinville, WA (US); Adam Laird Tubbs, Seattle, WA (US)

(73) Assignee: PACCAR Inc, Bellevue, WA (US)

( * ) Notice: Subject to any disclaimer, the term of this patent is extended or adjusted under 35 U.S.C. 154(b) by 1019 days.

(21) Appl. No.: 11/940,256

(22) Filed: Nov. 14, 2007

(65) Prior Publication Data

US 2009/0120066 A1    May 14, 2009

(51) Int. Cl.
*F01N 3/02* (2006.01)
(52) U.S. Cl. ............... 60/317; 60/280; 60/289; 60/319; 60/320
(58) Field of Classification Search ............. 60/280, 60/289, 290, 302, 317, 319, 320, 324
See application file for complete search history.

(56) References Cited

U.S. PATENT DOCUMENTS

| | | |
|---|---|---|
| 2,112,534 A | 3/1938 | Keen |
| 2,308,059 A | 1/1943 | Decker |
| 2,323,891 A | 7/1943 | Blanchard |
| 2,652,127 A | 9/1953 | Johnston |
| 2,858,853 A | 11/1958 | Lyon |
| 2,926,743 A | 3/1960 | Melchior |
| 3,053,340 A | 9/1962 | Kutney |
| 3,066,595 A | 12/1962 | Le Quec |
| 3,116,596 A | 1/1964 | Boehme |
| 3,241,316 A | 3/1966 | Endres |
| 3,282,047 A | 11/1966 | Wertheimer |
| 3,561,210 A | 2/1971 | Wiseman, Jr. |
| 3,635,308 A | 1/1972 | Millman |
| 3,875,745 A | 4/1975 | Franklin |
| 3,880,252 A | 4/1975 | Mucka |
| 3,952,823 A | 4/1976 | Hinderks |
| 3,970,168 A | 7/1976 | Mucka |
| 4,060,985 A | 12/1977 | Fukushima |
| 4,142,606 A | 3/1979 | Vanderzanden |
| 4,233,812 A | 11/1980 | Leistritz |
| 4,313,523 A | 2/1982 | Copen |
| 4,465,154 A | 8/1984 | Hinderks |
| 4,638,632 A | 1/1987 | Wulf |
| 4,655,035 A | 4/1987 | Sager, Jr. |
| 4,679,395 A | 7/1987 | Ou |
| 4,685,292 A | 8/1987 | Brigham |
| 4,789,117 A | 12/1988 | Paterson |
| 4,809,502 A | 3/1989 | Iida |
| 4,864,819 A | 9/1989 | Steyer |
| 4,872,308 A | 10/1989 | Nagai |
| 5,058,703 A | 10/1991 | Ealba |
| 5,110,560 A | 5/1992 | Presz, Jr. |
| D357,665 S | 4/1995 | Creyts |

(Continued)

*Primary Examiner* — Tu Nguyen
(74) *Attorney, Agent, or Firm* — Christensen O'Connor Johnson Kindness PLLC

(57) ABSTRACT

A cooling system for cooling exhaust gases includes a section of pipe adapted to receive exhaust gases having a first temperature. The cooling system further includes an air amplifier with a passage extending therethrough. The air amplifier receives a flow of compressed air and directs the flow of the compressed air through the passageway. The compressed air entrains ambient air into one end of the passageway so that discharge air, which includes compressed air and ambient air, is discharged from the other end of the passageway. A conduit is connected to the air amplifier and extends through a wall of the section of pipe. Discharge air from the air amplifier passes through the conduit into the interior portion of the pipe and mixes with the exhaust gases. The mixture of discharge air and exhaust gases has a second temperature that is less than the first temperature.

17 Claims, 7 Drawing Sheets

U.S. PATENT DOCUMENTS

| | | |
|---|---|---|
| 5,453,107 A | 9/1995 | Liu |
| 5,761,900 A | 6/1998 | Presz, Jr. |
| 5,857,327 A * | 1/1999 | Sato et al. ................ 60/302 |
| 5,974,802 A | 11/1999 | Blake |
| 6,010,379 A | 1/2000 | Baumann |
| 6,247,523 B1 | 6/2001 | Shibagaki |
| 6,267,106 B1 | 7/2001 | Feucht |
| 6,385,968 B1 | 5/2002 | Gustafsson |
| 6,425,382 B1 | 7/2002 | Marthaler |
| 6,615,576 B2 | 9/2003 | Sheoran |
| 6,811,756 B2 | 11/2004 | Atkinson |
| 6,926,074 B2 | 8/2005 | Wörner |
| 7,028,680 B2 | 4/2006 | Liu |
| 7,032,578 B2 | 4/2006 | Liu |
| 7,036,529 B2 | 5/2006 | Berggren |
| 7,051,524 B1 | 5/2006 | Kraft |
| 7,107,765 B2 | 9/2006 | Fults |
| 7,207,172 B2 * | 4/2007 | Willix et al. ................ 60/317 |
| 7,281,530 B2 * | 10/2007 | Usui ................ 123/568.17 |
| 7,833,301 B2 * | 11/2010 | Schindler et al. ............ 55/385.3 |
| 2007/0079604 A1 * | 4/2007 | Macaluso ................ 60/289 |

* cited by examiner

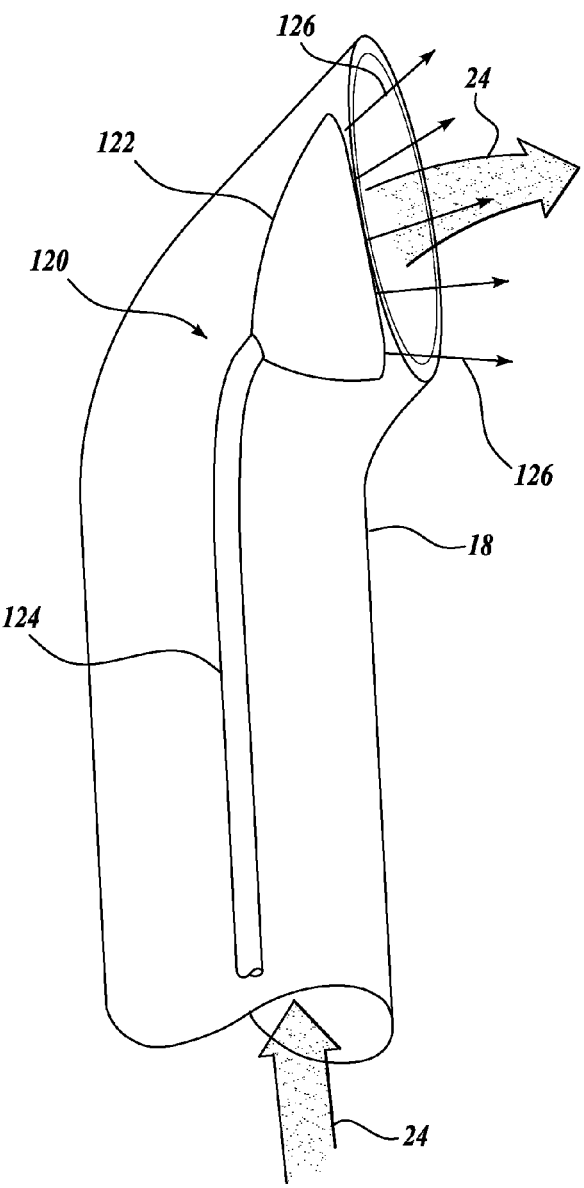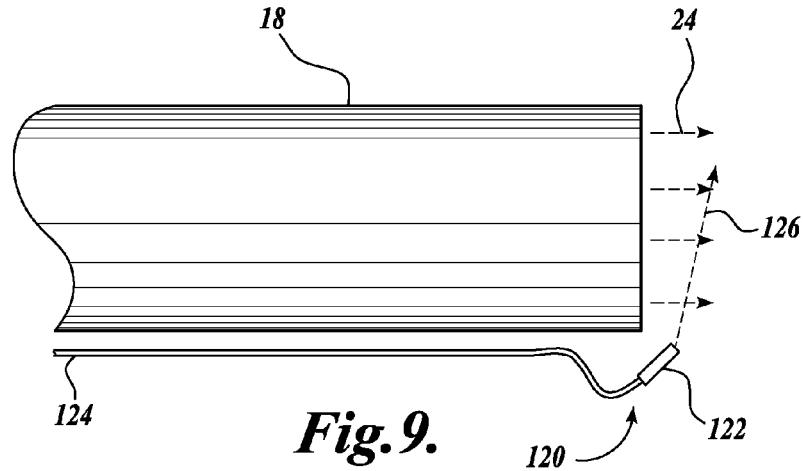

COOLING DEVICE FOR HIGH TEMPERATURE EXHAUST

BACKGROUND

New, more stringent emission limits for diesel engines necessitate the use of exhaust after-treatment devices. One such after-treatment device is a diesel particulate filter (DPF), which removes fine carbon particles (soot) and other diesel particulate matter from the exhaust gases emitted from a diesel engine. As exhaust gases pass through a DPF, particulate matter is removed from the exhaust gases and deposited onto the interior walls of the filter.

Many after-treatment devices undergo periodic regeneration cycles, during which accumulated particulate matter is removed from the device. A regeneration cycle can be passive, active, or a combination thereof. Passive regeneration removes particulate matter through the use of a catalyst. Active regeneration uses a fuel burner to heat the exhaust gases passing through the filter to a temperature that causes the particulate mater to combust.

During an active regeneration cycle, the temperature of the exhaust gas plume may rise significantly above acceptable temperatures normally experienced by exhaust systems without such after-treatment devices. As an example, exhaust systems without after-treatment devices typically discharge exhaust gas at a temperature of around 650 degrees Kelvin. In contrast, an exhaust system having an after-treatment device that includes an active regeneration cycle may experience an exhaust gas plume temperature exceeding 900 degrees Kelvin at its center core. The elevated exhaust gas temperature also increases the surface temperature of the exhaust system components.

It is desirable to decrease the temperature of the exhaust gas plume, and thus, the temperature of the surface of the exhaust system components. Presently known exhaust cooling systems generally lower exhaust gas temperatures by mixing ambient air with the exhaust gases near or after discharge from the exhaust system, and are therefore ineffective in reducing the temperature of the surfaces of the exhaust components. Thus, there exists a need for an exhaust cooling system that lowers the temperature of both the discharged exhaust gases and also the exhaust component surfaces.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In a first embodiment, a disclosed cooling system is adapted to lower the temperature of exhaust gases emitted from, for example, a vehicle engine. The cooling system includes a section of pipe with an inlet end and an outlet end. An air amplifier is capable of receiving a flow of compressed air and directing the flow through a passageway that extends through the air amplifier. The flow of compressed air along the surface of the passageway entrains ambient air into an inlet end of the air amplifier so that the flow of compressed air and the entrained air are both discharged from a discharge end of the air amplifier.

The discharge end of the air amplifier is connected to a conduit that passes through the wall of the section of pipe so that air discharged from the air amplifier flows through the conduit into the section of pipe. The air discharged from the air amplifier mixes with the hot exhaust gases to cool the exhaust gases. Because the temperature of the exhaust gases is lowered, the surface temperature of the exhaust system components is also lowered.

In a second embodiment, an exhaust system for a vehicle includes an exhaust pipe having an inlet end in fluid communication with the engine for receiving exhaust gases produced by the engine. An air amplifier is adapted to receive a flow of compressed air and to redirect the flow of compressed air through a passageway extending through the air amplifier. The flow of compressed air induces a secondary flow of ambient air through the passageway. A conduit is in fluid communication with the passageway of the air amplifier to receive the flow of compressed air and the secondary flow of ambient air from the air amplifier. The conduit extends through a wall of the exhaust pipe so that air from the air amplifier is discharged into the exhaust pipe. Exhaust gases received from the engine mix with the air from the air amplifier, thereby cooling the exhaust gases before they are discharged from the discharge end of the exhaust system.

In a third embodiment, a system for cooling exhaust gases emitted from an engine includes a section of pipe having an inlet end and a discharge end. The section of pipe is adapted to receive exhaust gases into the inlet end. A air amplifier is adapted to direct a flow of compressed air through a passageway extending through the air amplifier so that the flow of compressed air entrains a secondary flow of ambient air through the passageway. The air amplifier is mounted to one end of a funnel so that the flow of compressed air and the secondary flow of ambient air discharged from the air amplifier entrains a tertiary flow of ambient air through an aperture formed between the funnel and the air amplifier. A second end of the funnel extends through the a wall of the section of pipe so that air flowing through the funnel is discharged into the section of pipe.

DESCRIPTION OF THE DRAWINGS

The foregoing aspects and many of the attendant advantages of this invention will become more readily appreciated by reference to the following detailed description, when taken in conjunction with the accompanying drawings, wherein:

FIG. 7 is an isometric view of an exemplary active diffuser for the cooling device shown in FIG. 1;

FIG. 8 is a partial side view of the active diffuser shown in FIG. 7; and

FIG. 9 is an end view of the active diffuser shown in FIG. 7.

DETAILED DESCRIPTION

Figure 1:
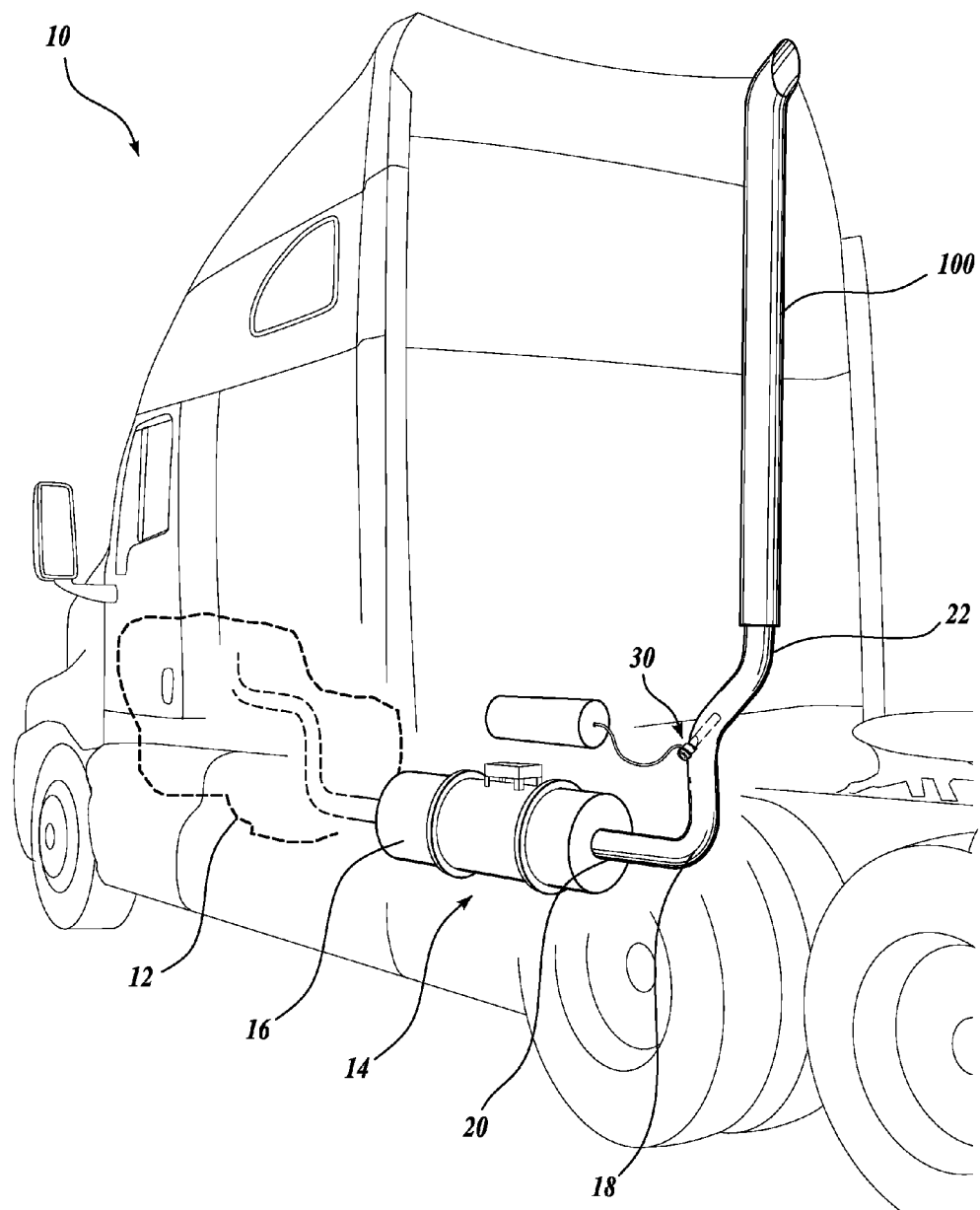
FIG. 1 is an isometric view of a heavy duty truck having an exemplary embodiment of a cooling device for high temperature exhaust according to the present disclosure.

Referring now to FIG. 1, a vehicle 10 includes an engine 12 and an exhaust system 14 in fluid communication with the engine 12 for receiving exhaust gases produced during engine operation. The exhaust system 14 includes an after-treatment device 16, such as a diesel particulate filter (DPF), for removing particulate matter from the exhaust gases. The exhaust system 14 also includes an exhaust pipe 18 having a first end 20 in fluid communication with the after-treatment device 16 and a second end 22 positioned to discharge exhaust gases at a predetermined location and in a predetermined direction. An air injector 30 is located near the after-treatment device 16 and an optional diffuser 100 is positioned at the second end 22 of the exhaust pipe 18. The air injector 30 and the diffuser 100 both introduce ambient air into the exhaust pipe 18 in order to lower the temperature of the exhaust gases passing therethrough.

Figure 2:
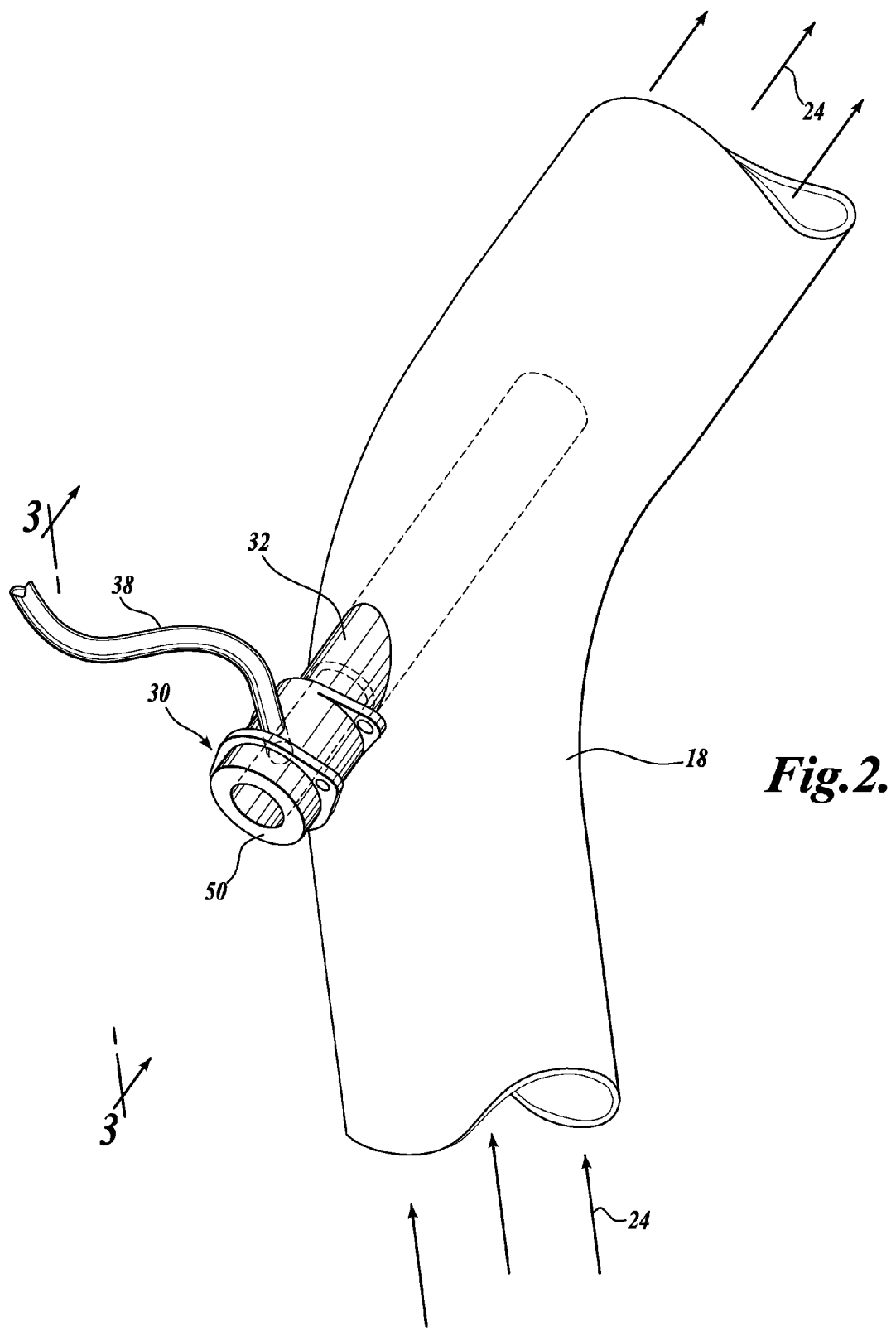
FIG. 2 is an isometric view of an exemplary air injection system for the cooling device shown in FIG. 1.
Figure 3:
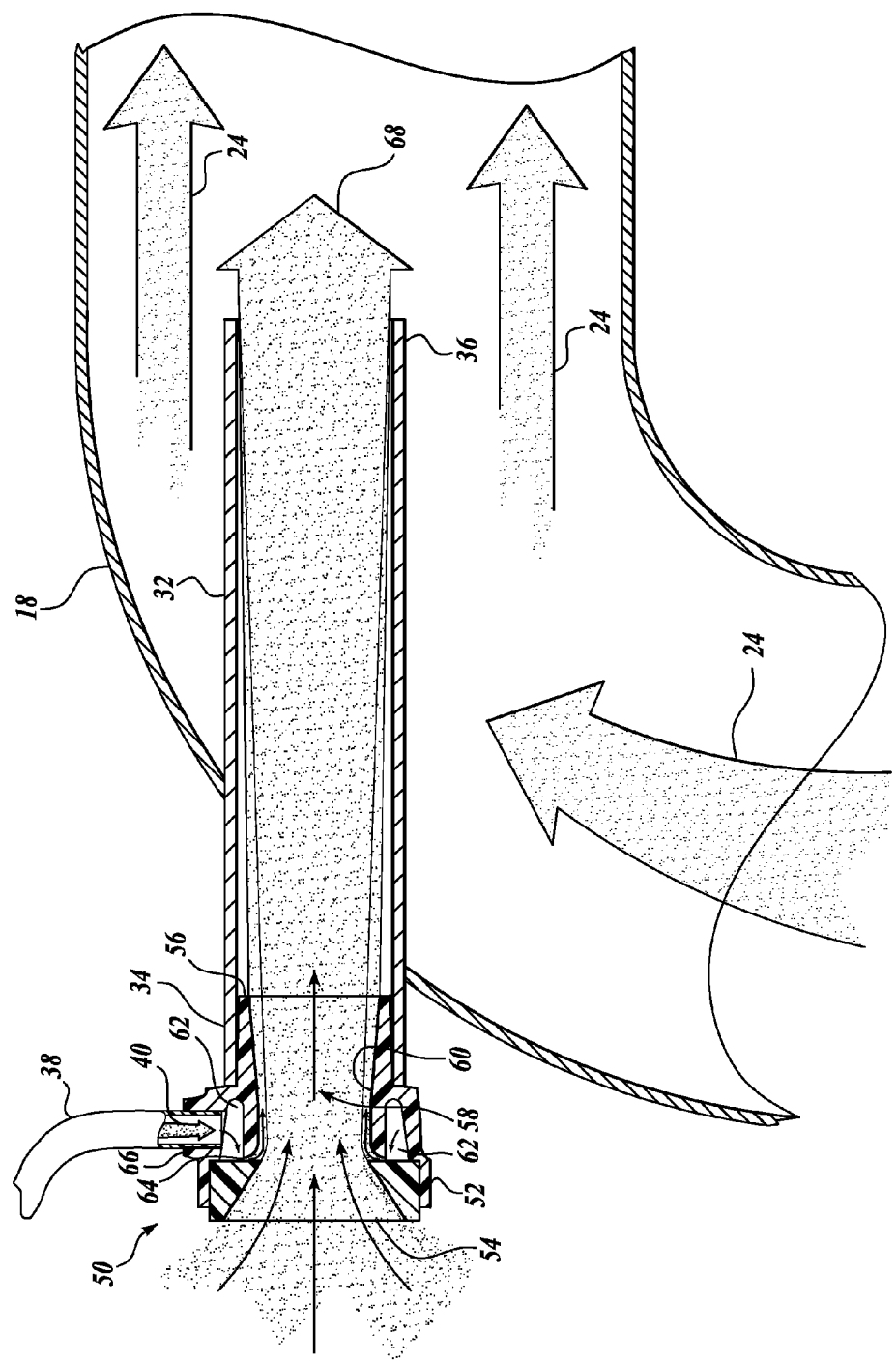
FIG. 3 is partial side cutaway view of the air injection system shown in FIG. 2.

A first embodiment of the air injector 30 is best understood by referring to FIGS. 2 and 3. The air injector 30 includes a conduit 32 that passes through the wall of the exhaust pipe 18. A first end 34 of the conduit 32 is located outside of the exhaust pipe 18 and is secured to an air amplifier 50. The second end 36 of the conduit 32 is located in an interior portion of the exhaust pipe 18 so that air discharge from the second end 36 of the conduit 32 flows in the same general direction as exhaust gases 24 passing through the exhaust pipe 18.

Operation of the air injector 30 shown in FIG. 2 will now be described with reference to FIG. 3. The air amplifier 50 includes a body 52 having an input end 54 and a discharge end 56. A passageway 58 extends through the air amplifier 50 and is defined by an annular surface 60 having a convex shape. The passageway 58 opens to an exterior source of ambient air at the input end 54 of the air amplifier. The discharge end 56 of the air amplifier 50 is located opposite the input end 54 and is fixedly secured to the conduit 34 that passes through the wall of the exhaust pipe 18. As a result, the passageway 58 is in fluid communication with the interior of the exhaust pipe 18.

An annular chamber 62 is formed in the body 52 around the passageway 58. An annular gap 64 connects the annular chamber 62 and the passageway 58 to provide fluid communication therebetween. A compressed air inlet 66 extends through the body 52 of the air amplifier 50 into the annular chamber 62, and a compressed air supply hose 38 is fluidly coupled to the inlet 66 to provide compressed air 40 to the air amplifier 50. The compressed air 40 is preferably supplied by an existing source, such as the pneumatic system used to supply compressed air to the vehicle's air brakes or air suspension. It should be appreciated, however, that any suitable source of compressed air may be utilized, including a dedicated air compressor.

In operation, compressed air 40 from the compressed air supply hose 38 enters the annular chamber 62 of the air amplifier 50 through the inlet 66. The compressed air fills the annular chamber 62 and passes into the passageway 58 through the annular gap 64. The convex shape of the annular surface 60 causes a Coanda effect, also known as boundary layer attachment, whereby compressed air passing through the annular gap 64 tends to follow the contour of the annular surface 60 rather than travel in a straight line. As a result, the compressed air travels at a high speed along the perimeter of the passageway 58.

The high speed air flow along the annular surface 60 creates a low pressure area at the input end 54 of the air amplifier 50. The low pressure entrains a secondary flow of ambient air into the input end 54 of the air amplifier 50. As a result, ambient air flows through the air amplifier 50 and produces a high velocity, high volume flow of output air 68 at the discharge end 56 of the air amplifier 50. Known air amplifiers have amplification ratios up to 25, where the amplification ratio is defined as the ratio of the total output flow of the amplifier to the flow of the supplied compressed air. It should be appreciated that the described air amplifier is exemplary in nature and should not be considered limiting. In this regard, various embodiments of the air amplifier are possible and are within the scope of the disclosure and appended claims.

The high velocity, high volume flow of output air 68 produced by the air amplifier 50 passes through the conduit 32 and is discharged into the stream of hot exhaust gases 24 passing through the exhaust pipe 18. The output air 68, which is at a generally ambient temperature, mixes with the exhaust gases 24, thereby reducing the overall temperature of the gases flowing through the exhaust pipe 18.

As previously noted, in addition to lowering the temperature of the exhaust gases 24 discharged from the exhaust pipe 18, it is also desirable to decrease the surface temperature of the exhaust system components. For this reason, it is preferable to locate the air injector 30 upstream from the discharge portion of the exhaust pipe 18, i.e., closer to the input end 20 of the exhaust pipe 18, in order to maximize the portion of the exhaust system 14 through which cooled gases flow. It should be appreciated that the air injector 30 may be adapted to inject air into the exhaust flow at any position along the path of the exhaust system 14 that is downstream of the after-treatment device 16.

The air injector 30 is operated by selectively controlling the supply of compressed air provided to the air amplifier 50 through the use of a valve or another known means. In one embodiment, the air injector 30 is automatically operated to inject air into the exhaust stream only during an active regeneration. In another embodiment, the air injector 30 automatically operates only during an active regeneration cycle that occurs when the vehicle is stationary. In still another embodiment, operation of the air injector 30 is manually initiated by the vehicle operator. It should be understood that various methods or combinations of methods can be used to control the operation of the air injector 30 without departing from the scope of the disclosure.

Figure 4:
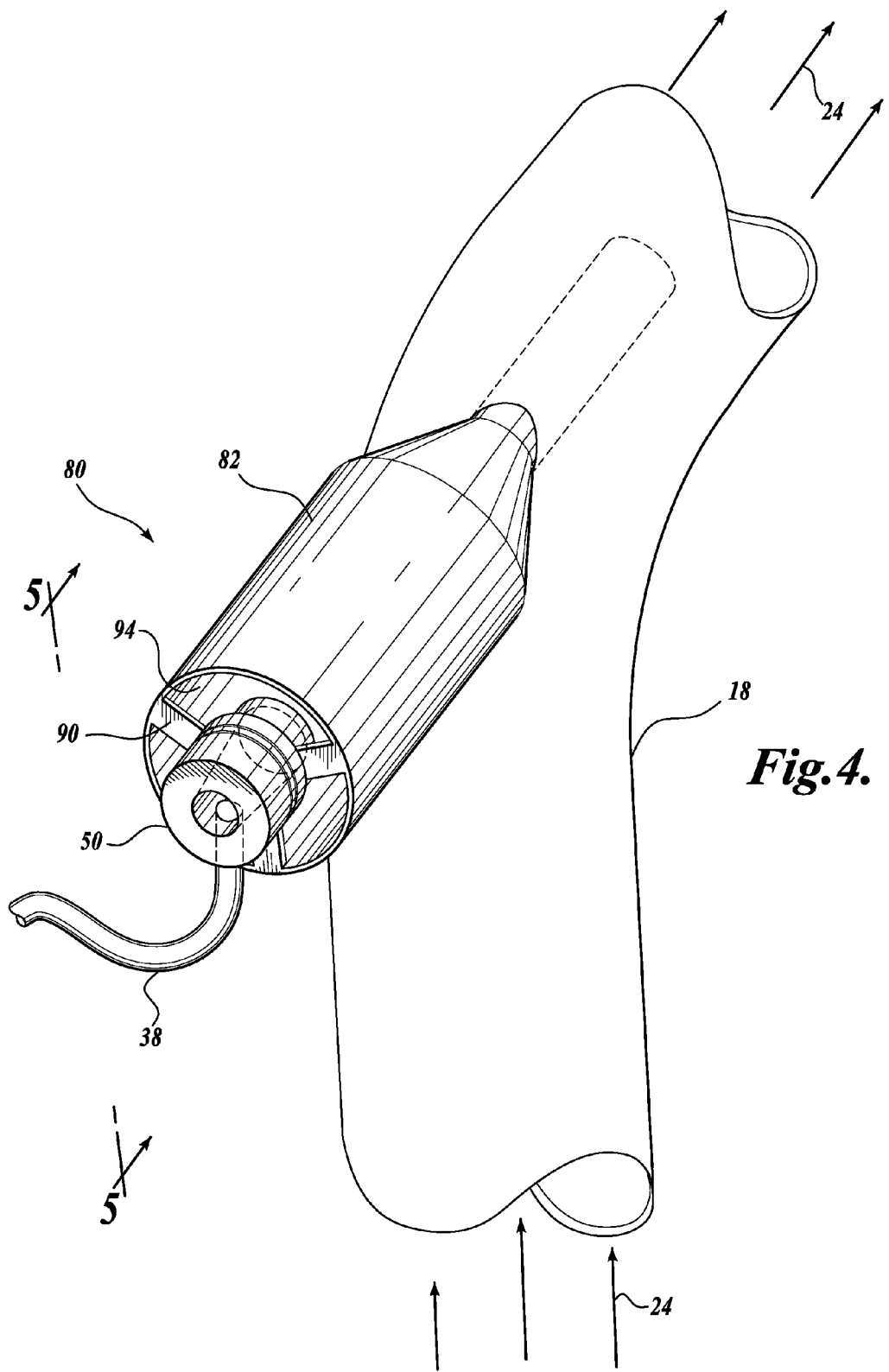
FIG. 4 is an isometric view of an alternate embodiment of the air injection system shown in FIG. 2.
Figure 5:
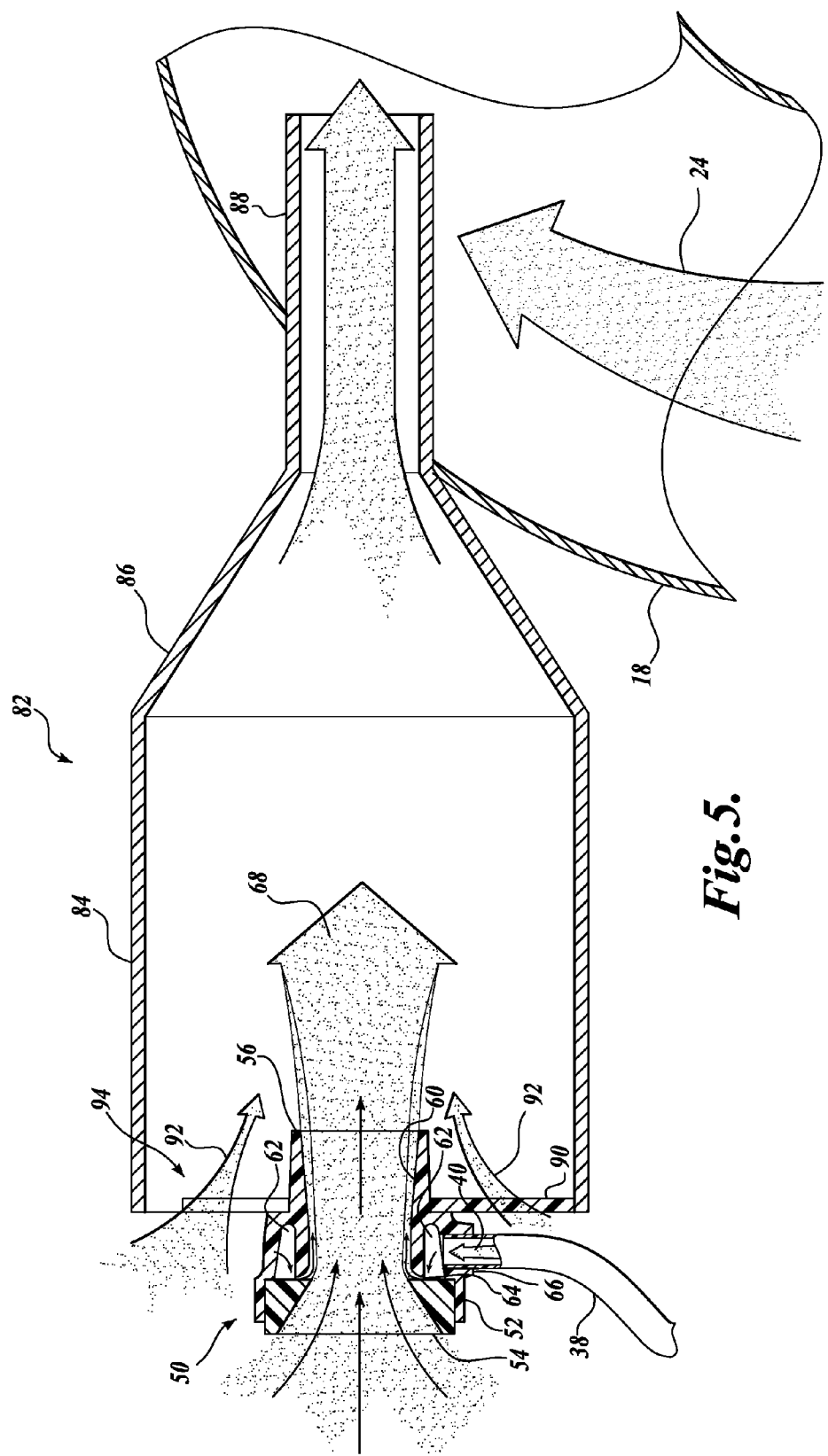
FIG. 5 is partial side cutaway view of the air injection system shown in FIG. 4.

As shown in FIGS. 4 and 5, a second embodiment of an air injector 80 includes an air amplifier 50 attached to one end of a funnel 82. The other end of the funnel 82 extends through the wall of the exhaust pipe 18 and ends at a location inside the exhaust pipe 18. Referring specifically to FIG. 5, the funnel 82 includes a cylindrical portion 84 at one end, a conduit portion 88 at the opposite end, and a tapered portion 86 providing a transition from the larger diameter of the cylindrical portion 84 to the smaller diameter of the conduit portion 88. The conduit portion 88 is positioned such that air is discharged from the conduit portion 88 into the exhaust pipe 18 in substantially the same direction as the exhaust gases 24 passing through the exhaust pipe 18.

While the funnel 82 is illustrated to have a generally round cross-section, this illustration is exemplary only, and should not be considered limiting. Alternate embodiments of the funnel 82 are possible wherein the cross-section for the funnel 82 or portion thereof has different shapes, such as oval, rectangular, square, etc. Further it should be appreciated that the centerline of the funnel 82 need not be straight, as illustrated, but may follow any path from the air amplifier 50 to the exhaust pipe 18.

The air amplifier 50 is secured to the cylindrical portion 84 of the funnel 82 by one or more supports 90 that extend radially from the air amplifier 50 to the funnel 82. The supports 90 hold the air amplifier 50 in a position such that air discharged by the air amplifier 50 flows into the funnel 82. The air amplifier 50 is positioned so that one or more gaps 94 exist between the outside of the air amplifier 50 and the inner surface of the cylindrical portion 84.

The air amplifier 50 of the second embodiment of the air injector 80 operates in the same manner as the air amplifier 50 included in the previously described first embodiment of the air injector 30. As shown in FIG. 5, compressed air 40 is supplied to the annular chamber 62 of air amplifier 50 through an inlet 66 and travels through an annular gap 64 to a passageway 58 extending through the air amplifier 50. The flow of compressed air through the passageway 58 creates a low pressure area at the input end 54 of the air amplifier 50 that induces a high speed, high volume flow of air through the air amplifier 50.

The high velocity, high volume flow of air 68 is discharged from the discharge end 56 of the air amplifier 50, which creates a low pressure area at the mouth of the funnel 82, i.e., the inlet end. This low pressure area entrains additional ambient air 92 into the funnel 82 through the gaps 94 between the air amplifier 50 and the funnel 82, thereby increasing the amount of air that flows through the funnel 82. The entrained air 92 mixes with the air discharged by the air amplifier 50 and flows through the tapered portion 86 of the funnel 82 to the conduit portion 88 of the funnel 82.

The mixture of output air 68 discharged by the air amplifier 50 and entrained air 92 flows through the conduit portion 88 of the funnel 82 and is discharged into the stream of hot exhaust gases 24 passing through the exhaust pipe 18. Air discharged from the conduit portion 88 at a generally ambient temperature and mixes with the exhaust gases 24 to reduce the overall temperature of the gases flowing through the exhaust pipe 18.

Figure 6:
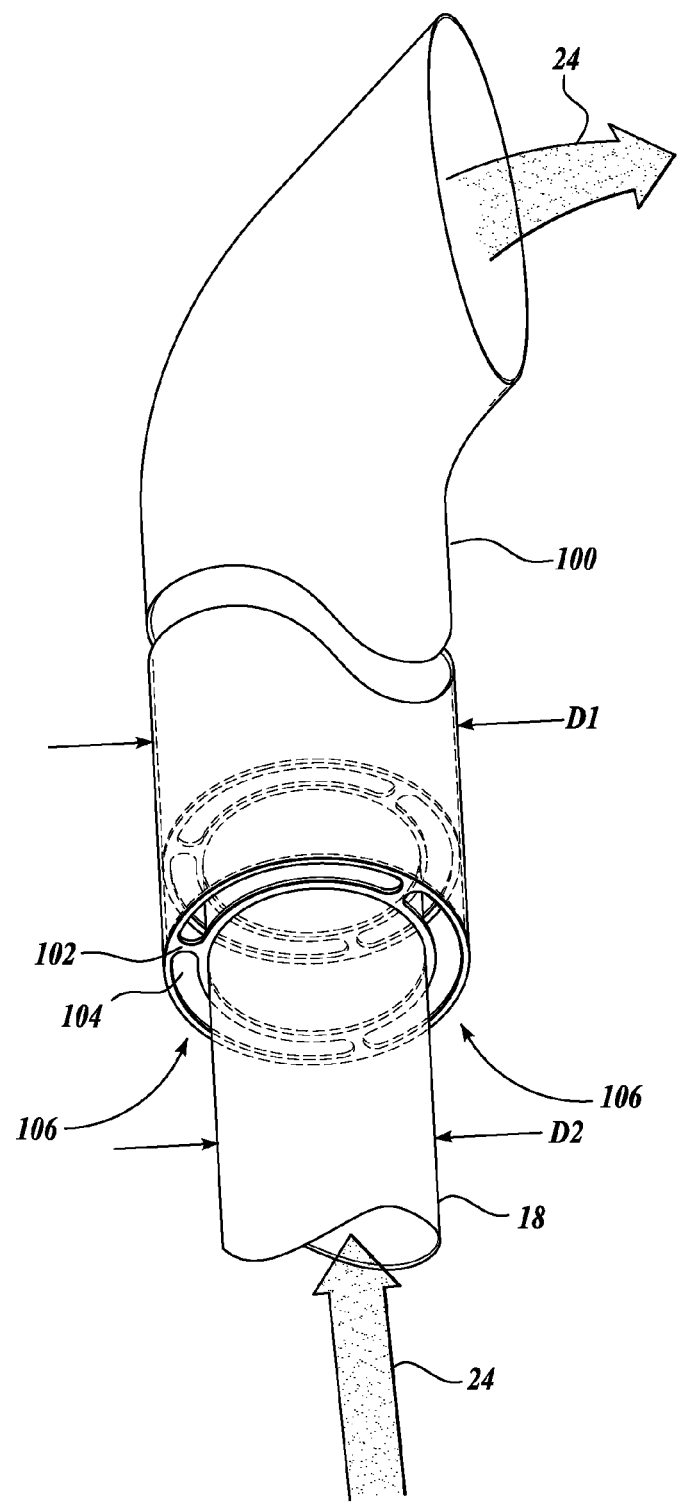
FIG. 6 is an isometric view of an exemplary passive diffuser for the cooling device shown in FIG. 1

The exhaust system 14 may include an optional diffuser 100 to introduce additional ambient air into the exhaust stream in order to further cool the exhaust gases 24 and the surfaces of the exhaust system components. As best shown in FIG. 6, one embodiment of the diffuser 100 is a cylindrical conduit having a diameter D1 that is greater than the diameter D2 of the exhaust pipe 18. The exhaust pipe 18 extends into the interior portion of the first end of the diffuser 100 so that the end of the exhaust pipe 18 is disposed within the diffuser 100. A plurality of radial supports 102 extend between the outer surface of the exhaust pipe 18 and the inner surface of the diffuser 100 to secure the diffuser 100 to the exhaust pipe 18. A plurality of apertures 104 are located in the area between the inner surface of the diffuser 100 and the outer surface of the exhaust pipe 18 to provide a fluid connection between the interior portion of the diffuser 100 and the ambient air outside of the exhaust system 14.

Exhaust gases 24 exit the exhaust pipe 18 into the first end of the diffuser 100 and flow through the diffuser 100 until they are discharged from the second end of the diffuser 100. The flow of exhaust gases 24 through the diffuser 100 creates a low pressure area at the plurality of apertures 104. Consequently, ambient air is drawn through the apertures 104 into the diffuser 100. This entrained air 106 mixes with the exhaust gases 24 to lower the temperature of the gases flowing through the exhaust system 14. In this manner the temperature of the exhaust plume discharged from the exhaust system 14, as well as the temperature of the surfaces of the exhaust system components, is reduced.

The diffuser 100 can be of any appropriate length, and as a result, the area at which entrained air 106 is introduced into the exhaust stream may be located anywhere along the exhaust stream between after-treatment device 16 and the location at which the exhaust gases 24 are discharged from the exhaust system 14. It should be appreciated that introducing entrained air 106 into the exhaust stream closer to the after-treatment device 16 will increase the amount of the exhaust system component surfaces that have a lowered temperature. In order to introduce entrained air 106 into the exhaust stream near the after-treatment device 16, the length of the diffuser 100 in exemplary embodiments may be equal to the length of the exhaust pipe 18, twice the length of the exhaust pipe 18, three times the length of the exhaust pipe 18, or any other length that is greater than the length of the exhaust pipe 18.

A second embodiment of a diffuser 120 is best understood with reference to FIGS. 7-9. The diffuser 120 includes a diffuser nozzle 122 that is positioned proximate to the discharge end of the exhaust pipe 18 and is in fluid communication with a compressed air supply line 124. Compressed air 126 is selectively supplied to the diffuser nozzle 122, which redirects the compressed air 126 across the discharge opening of the exhaust pipe 18. The compressed air 126, which is at a generally ambient temperature, mixes with the exhaust gases 24 discharged from the exhaust pipe 18 and disperses the exhaust plume. As a result, the temperature and concentration of the exhaust plume is lowered, decreasing the potential risk that a hot exhaust plume will injure a person or act as an ignition source in a combustible environment.

The foregoing embodiments are generally described with reference to cooling exhaust gases discharged from a vehicle engine; however, it should be appreciated that the illustrated embodiments are suitable for cooling gases produced by any engine producing heated exhaust gases, including engines used for generators, compressors, pumps, heavy duty equipment, etc. One of skill in the art would further appreciate that the disclosed embodiments are not limited to use with engines, but are also suitable for use with any system or apparatus that requires a flow of ambient air to cool a discharged fluid having an elevated temperature. Exemplary systems of this type may include cooling towers, heating ventilation and air conditioning (HVAC) systems, and the like.

While illustrative embodiments have been illustrated and described, it will be appreciated that various changes can be made therein without departing from the spirit and scope of the invention as claimed.

The embodiments of the invention in which an exclusive property or privilege is claimed are defined as follows:

1. An exhaust system for an engine, the exhaust system comprising:
   (a) an exhaust pipe having an inlet end in fluid communication with the engine for receiving exhaust gases produced by the engine and a discharge end for discharging exhaust gases received from the engine;
   (b) an air amplifier located external to the exhaust pipe, the air amplifier comprising:
      (i) a body having a passageway extending therethrough, a first end of the passageway defining an air amplifier inlet, a second end of the passageway defining an air amplifier outlet, the air amplifier outlet being located external to the section of pipe;
      (ii) a compressed air inlet extending at least part way through the body to receive a flow of compressed air and to direct the flow of the compressed air to an annular chamber formed in the body and surrounding the passageway, the annular chamber being in fluid communication with the passageway, wherein the flow of compressed air is supplied to the passageway from the annular chamber, the flow of compressed air entraining ambient air into the air amplifier inlet so that discharge air comprising the flow of compressed air and the entrained ambient air is discharged from the air amplifier outlet; and (c) a conduit extending through a wall of the exhaust pipe, a first end of the conduit being coupled to the air amplifier outlet to receive the discharge from the air amplifier, a second end of the conduit being located in an interior portion of the exhaust pipe.

2. The exhaust system of claim 1, wherein the engine is an internal combustion engine.

3. The exhaust system of claim 2, wherein an after-treatment device is positioned near the inlet end of the exhaust pipe and is capable of removing particulate matter from the exhaust gases produced by the engine, the second end of the conduit being positioned within the exhaust pipe at a location downstream of the after-treatment device.

4. The exhaust system of claim 1, further comprising a diffuser having an inlet end adapted for receiving exhaust gases discharged from the exhaust pipe and a discharge end for discharging exhaust gases received from the exhaust pipe, wherein a space between the discharge end of the exhaust pipe and the inlet end of the diffuser defines at least one aperture so that the flow of exhaust gases through the diffuser entrains ambient air through the at least one aperture into the diffuser.

5. The exhaust system of claim 4, wherein the diffuser and the exhaust pipe each has a length, the length of the diffuser being greater than the length of the exhaust pipe.

6. The exhaust system of claim 1, further comprising a compressed air source in fluid communication with the air amplifier to provide the flow of compressed air.

7. The exhaust system of claim 6, further including a controller operatively coupled to the compressed air source for selectively controlling the flow of compressed air to the air amplifier.

8. The exhaust system of claim 7, wherein the controller controls the flow of compressed air in response to a control signal, the control signal being one or more of the group consisting of a regeneration process signal, a stationary vehicle signal, and manual air injection signal.

9. A cooling system for exhaust gases, the cooling system comprising:

(a) a section of pipe having an inlet end and a discharge end, the inlet end being adapted to receive exhaust gases having a first temperature;

(b) an air amplifier, comprising:
(i) a body having a passageway extending therethrough, a first end of the passageway defining an air amplifier inlet, a second end of the passageway defining an air amplifier outlet, the air amplifier outlet being located external to the section of pipe;
(ii) an annular chamber formed in the body, the annular chamber surrounding and being in fluid communication with the passageway; and
(iii) an air inlet extending radially from the annular chamber through the body to receive a flow of compressed air from a compressed air supply, the air inlet supplying the flow of the compressed air through the annular chamber to the passageway to entrain ambient air into the air amplifier inlet so that discharge air comprising the flow of compressed air and the entrained ambient air is discharged from the air amplifier outlet; and (c) a conduit extending through a wall of the section of pipe, a first end of the conduit being positioned external to the pipe and coupled to the air amplifier outlet to receive the discharge air from the air amplifier, a second end of the conduit being disposed within an interior portion of the section of pipe so that the discharge air passes through the conduit into the interior portion of the section of pipe and mixes with exhaust gases passing therethrough, the mixture of discharge air and exhaust gases having a second temperature that is less than the first temperature.

10. The cooling system of claim 9, further comprising a compressed air source in fluid communication with the air amplifier for providing the flow of compressed air.

11. The cooling system of claim 10, further including a controller operatively coupled to the compressed air source for selectively controlling the flow of compressed air to the air amplifier.

12. The cooling system of claim 11, wherein the controller controls the flow of compressed air in response to a control signal, the control signal being one of the group consisting of a regeneration process signal, a stationary vehicle signal, and manual air injection signal.

13. The cooling system of claim 9, wherein the exhaust gases are emitted from an internal combustion engine.

14. The cooling system of claim 13, wherein the section of pipe forms at least a portion of an exhaust pipe, the exhaust pipe having an inlet end and an outlet end, the inlet end being adapted to receive the exhaust gases emitted from the internal combustion engine.

15. The cooling system of claim 14, wherein an after-treatment device is positioned near the inlet end of the exhaust pipe and is capable of removing particulate matter from the exhaust gases produced by the engine, the second end of the conduit being positioned within the exhaust pipe at a location downstream of the after-treatment device.

16. The cooling system of claim 14, further comprising a diffuser having an inlet end adapted for receiving exhaust gases discharged from the exhaust pipe and a discharge end for discharging exhaust gases received from the exhaust pipe, wherein a space between the discharge end of the exhaust pipe and the inlet end of the diffuser defines at least one aperture so that the flow of exhaust gases through the diffuser entrains ambient air through the at least one aperture into the diffuser.

17. The cooling system of claim 16, wherein the diffuser and the exhaust pipe each has a length, the length of the diffuser being greater than the length of the exhaust pipe.

* * * * *